(No Model.)

C. E. ALBRO.
CUTTER FOR CUTTING TEETH ON WORM WHEELS.

No. 263,299.          Patented Aug. 22, 1882.

Attests:

Inventor
Charles E. Albro
By his atty

UNITED STATES PATENT OFFICE.

CHARLES E. ALBRO, OF PHILADELPHIA, PENNSYLVANIA.

CUTTER FOR CUTTING TEETH ON WORM-WHEELS.

SPECIFICATION forming part of Letters Patent No. 263,299, dated August 22, 1882.

Application filed January 25, 1882. (No model.)

*To all whom it may concern:*

Be it known that I, CHARLES E. ALBRO, of the city and county of Philadelphia, and State of Pennsylvania, have invented an Improvement in Cutters for Cutting Teeth on Worm-Wheels, of which the following is a specification.

My invention has reference to gear-cutters adapted to cut the teeth on worm-wheels; and it consists in forming the cutter with a curvilinear surface parallel with its length, said curve corresponding to the periphery of the wheel to be cut at the base or roots of the teeth, or, in other words, the pitch-line of the worm-shaped cutter is curved to correspond with the pitch-line of the worm-wheel to be cut, the cutting-edges in said cutter being arranged in a helix and having their outer edges brought toward each other, so as to be in line with the radii of the worm-wheel it is designed to cut; further, in extending the cutting-edges so as to make a complete worm with deep notches across the teeth.

Figure 1:
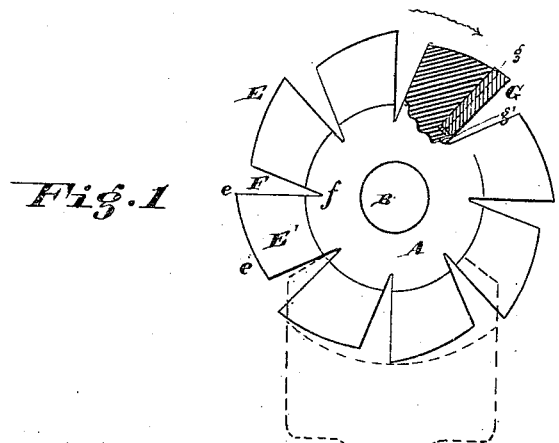
Figure 2:
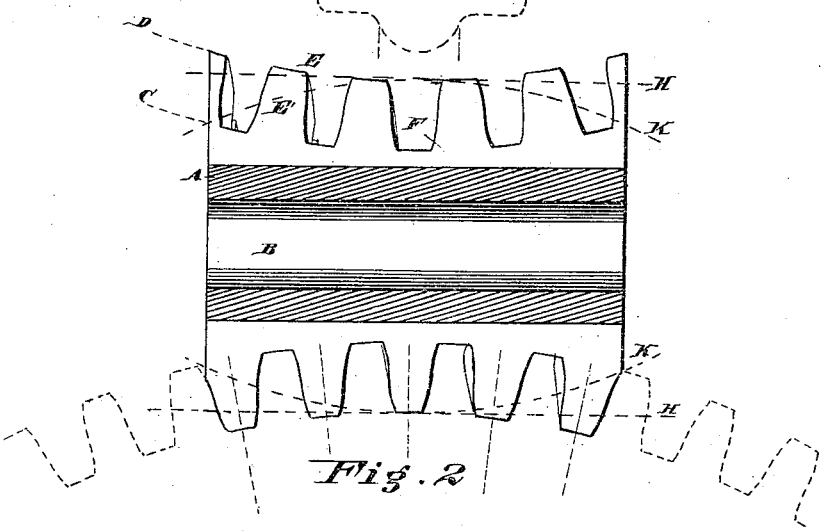
Figure 3:
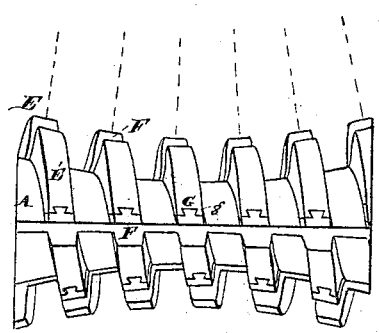

In the drawings, Figure 1 is an end view of my improved worm-wheel cutter, with a small part thereof in section. Fig. 2 is a sectional elevation of the same, showing its application to a worm-wheel, which is dotted; and Fig. 3 is an elevation of the cutter, showing the adaptation of removable cutters.

A is the body of the cutter. B is the hole for fitting it to the mandrel.

C represents the curved line, which corresponds to the base of the teeth of the cutter and the curve of the periphery or the circle on the largest diameter of the wheel which it is to cut.

D represents the curve of the cutter at the outer ends of the teeth, and which, if moved about the center line of said cutter, would describe the enveloping plane or surface within which the teeth are formed, and on vertical lines thereto, and also corresponds to the circle on the worm-wheel to be cut at the base or roots of the teeth thereon.

E represents the worm-teeth as a whole. F are deep notches or grooves extending the full length of the cutter and extending below the roots or base of the teeth E, thereby forming the worm E into segmental cutters E′, having radial cutting-edges *e*. These notches or grooves F form the cutters, and also provide means for the escape of the metal cut from the worm-wheel, and prevent any possibility of the cutters clogging. The outer surface of the segmental cutters E′ may recede toward the center as it recedes from the cutting-edges *e*, as shown at *e′*. The cutter is first made of annealed steel, and after being cut in a properly-organized machine, which I do not propose to describe here, it is then notched or grooved, as at F, and after properly forming the cutting-edges *e*, commonly known as "relieving" them, it is hardened and tempered. The segmental cutters E′ are made so as to radiate from a point corresponding with the center of the worm-wheel they are made to cut, as shown in Fig. 2.

To make the cutter more durable the cutting-edges *e* may be made removable, as shown, by making a steel cutter, G, to slide into the dovetail groove *g*, as shown in Figs. 1 and 3, which may also be made adjustable to take up wear by placing liners *g′* under them.

It is not necessary to my invention that the outer curve, D, should be the same as the curve at the roots of the teeth of the worm-wheel it is designed to cut, as the curve D may correspond to the curve at the outer edge of the teeth of said worm-wheel, or the outer surface may be cylindrical, as shown by dotted line H, or it may be curved in the opposite direction, as shown in dotted line K, making the cutter substantially egg-shaped; but in all these cases the curve at the roots of the teeth on the cutter coincides exactly with the curve or periphery of the worm-wheel it is to cut, and all of the teeth of the cutter radiate from a point corresponding with the center of the worm-wheel the teeth of which it is to cut.

Having now described my invention, what I claim as new, and desire to secure by Letters Patent, is—

1. A cutter for cutting the teeth on worm-wheels, which consists of a body having cutters spirally arranged thereon and converging to a point corresponding to the center of the worm-wheel the teeth of which it is made to cut, substantially as and for the purpose specified.

2. A cutter for cutting the teeth on worm-wheels, which consists of a body having cutters spirally arranged thereon, converging to a point corresponding to the center of the worm-wheels the teeth of which it is to cut, and having its outer cutting-surface curved to correspond with the periphery of the worm-wheel it is to cut, substantially as and for the purpose specified.

3. A cutter for cutting the teeth on worm-wheels, having segments spirally arranged thereon, in combination with adjustable and removable cutters fitted thereto, said cutters converging to a point corresponding with the center of the worm-wheel the teeth of which they are made to cut, substantially as and for the purpose specified.

4. A cutter for cutting worm-wheels, which consists of a body having cutters spirally arranged thereon, converging to a point corresponding to the center of the worm-wheel the teeth of which it is to cut, and having its outer cutting-surface curved to correspond with the curve of the root-circle of the teeth of the worm-wheel it is to cut, the distance between centers at the outer edge of said teeth being smaller than the distance between the roots of said teeth, the difference being in proportion to the difference in the diameters of the face and root circles of the teeth of the worm-wheel it is to cut, substantially as and for the purpose specified.

In testimony of which invention I hereunto set my hand.

CHARLES E. ALBRO.

Witnesses:
R. S. CHILD, Jr.,
LOUIS S. MATAS.